United States Patent [19]

Gillespie

[11] 4,065,597

[45] Dec. 27, 1977

[54] FIBRE-REINFORCED LAMINATES

[76] Inventor: David L. Gillespie, Grovers Farm, Dippenhall, Farnham, Surrey, England

[21] Appl. No.: 587,697

[22] Filed: June 17, 1975

[30] Foreign Application Priority Data

June 26, 1974 United Kingdom ............... 28465/74

[51] Int. Cl.² ............................................ C04B 31/06

[52] U.S. Cl. .................................... 428/285; 428/288; 428/289; 428/367; 428/268; 156/42; 264/258

[58] Field of Search ............... 428/289, 426, 446, 538, 428/369, 367, 368, 268, 273, 297, 285, 288; 106/110; 156/39, 42

[56] References Cited

U.S. PATENT DOCUMENTS

| | | | |
|---|---|---|---|
| 3,556,922 | 1/1971 | Green et al. | 428/367 X |
| 3,754,957 | 8/1973 | Druin et al. | 428/367 X |
| 3,944,698 | 3/1976 | Dierks et al. | 428/297 X |

FOREIGN PATENT DOCUMENTS

| | | | |
|---|---|---|---|
| 769,414 | 3/1957 | United Kingdom | 156/42 |
| 1,204,541 | 9/1970 | United Kingdom. | |

*Primary Examiner*—Ralph S. Kendall
*Attorney, Agent, or Firm*—Sherman & Shalloway

[57] ABSTRACT

A laminate of plaster reinforced with a monofilament, continuous strand, glass fibre, preferably in the form of a mat. The laminate can be made flexible by subjecting it to stress, such as by rolling it to cause flexion.

14 Claims, 4 Drawing Figures

FIBRE-REINFORCED LAMINATES

BACKGROUND OF THE INVENTION

1. Field of the Invention

This invention relates to a fibre-reinforced plaster laminates and methods for their production.

2 Description of the Prior Art

Laminates of a resin, usually polyester, reinforced with glass fibre find many applications in architecture, for example in partitions and in ceilings having a complex structure to conceal lighting and other services. Such laminates are inherently combustible and the additives that are used in order to render them fire-resistant or fire-retardant often give rise to very toxic fumes in the event of a fire; moreover, despite the properties imparted by the additives, the resin in the laminates still tends to emit a great deal of smoke when subjected to high temperatures.

Glass-fibre reinforced gypsum plasterboards, mouldings and extrusions have been proposed for constructional use, for example, in the manufacture of wall, floor, ceiling or roof structures, doors and cabinets. However, such articles were conceived apparently as substitutes for plaster board or its equivalent, and as such were of considerable thickness, which meant that not only were they heavy and dense, but also that the excess water that was necessary to achieve adequate wetting of the glass reinforcement required the use of cumbersome production techniques in order to remove it. However, the removal of water by vacuum techniques tended to draw in air and create small voids and surface blemishes. Moreover, the production techniques referred to above resulted in a poor surface finish due to denuding the surface glass of the gypsum, and among non-planar articles, could be adapted to the production only of simple two-dimensional folded shapes.

SUMMARY OF THE INVENTION

The present invention stems from the realization that a thin sheet of reinforced plaster can have good structural properties, and that a thin sheet can be more easily produced than a thick sheet because the excess water can be removed simply by heating; moreover, it has been found that it is not necessary with a thin sheet to apply vacuum or pressure to avoid creating voids and cavities, and it is possible at the same time to use a thicker paste having a water content more nearly equal to the stoichiometric amount required for hydration.

According to one aspect of the present invention there is provided a thin laminate of fibre-reinforced plaster normally having a thickness preferably of not more than 5 mm. As the reinforcement, it is preferred to use glass fibre.

According to the invention in another aspect there is provided a laminate of plaster reinforced with a monofilament, continuous strand glass fibre. Monofilament, continuous strand glass fibre is used rather than a conventional chopped strand mat in which bundles of filaments make-up the reinforcement.

Preferably the glass fibre is in the form of a mat. The preferred type of mat is the very thin form known as tissue which allows a fine smooth edge to be achieved on the laminate; several layers of mat are normally used. For additional strength bands of carbon fibre may be sandwiched between two layers of tissue. It has been found that the optimum amount of the reinforcement is 4% by weight.

According to a further aspect of the invention such a laminate is prepared by impregnating fibre reinforcement with a plaster slurry against a moulding surface and drying the impregnated fibre reinforcement.

The fibre reinforcement may be applied to a moulding surface and the slurry applied thereto by, for example, brushing or spraying and then applying heat to dry the reinforcement thus impregnated. As a temperature greater than 40° C is detrimental to the characteristics of the hydrated plaster, a temperature below this should be used.

The plaster slurry may be applied to the moulding surface, the fibre reinforcement laid on the slurry and pressure applied to force the fibre reinforcement through the slurry and against the said surface.

The preferred plaster is autoclaved plaster and it is preferably used with a wetting agent such as a non-foaming detergent to improve the contact of the crystals with the glass fibre and also with a drying retardant such as sodium citrate to allow the laying up process to be completed before setting starts.

While for some applications a rigid sheet is preferable, there is also provided according to a yet further aspect of the present invention a thin, flexible fibre-reinforced plaster laminate. Such a flexible laminate is achieved by applying a flexing stress progressively over the cured sheet, for example by rolling the above-described thin rigid laminate in one or more directions between metal press rollers so as to achieve flexion through an angle of up to about 10°. If rolling is performed in one direction only, the rolled laminate will be flexible in one direction only rather in the manner of a corrugated sheet. If the laminate is rolled biaxially the laminate will be found to flex in all directions under stress. Alternatively a three-dimensional laminate may be stressed by the use of a vibrator applied over the surface of the moulding.

Such a flexible or stressed laminate is found to have much improved shock-resistance which provides useful protection from damage by dropping, and improved fire-resistance. The explanation for the acquisition of these remarkable properties is believed to be that the bond between the interlocking hydrated gypsum crystals and the reinforcement is broken, allowing a very slight relative movement between the reinforcement and the adjacent crystals when the laminate is flexed; moreover the freedom of the fibres to move slightly within the tunnels formed by the adjacent crystals allows a shock to be transmitted away from the point of impact and then absorbed more easily without fracture of the material. This freedom of the fibres also appears to be responsible for the freedom from warping or cracking of the unflexed material when it is subjected to thermal shock or expansion, as compared with the rigid laminate. Accordingly a stressed laminate can be used as a fire-resistant cladding on, for example, a foamed glass or vermiculate panel to form a rigid sandwich.

A plurality of such laminates each rolled in one direction only can be laminated together, using a suitable adhesive such as urea formaldehyde glue, such that adjacent laminates have been rolled in planes mutually at right angles. Such a structure, which may be likened to plywood, has good fire-resistant properties and is suitable for use in fire proof safes, as cladding for fire-retardant doors etc.

As compared with a glass reinforced resin laminate the plaster laminate of the present invention has the following advantages: 1) Lower cost, the price of the raw material plaster being only about 1/20 that of the resin-forming materials which are derived from oil; 2) Lower weight, the weight of the plaster laminate being about only ⅔ that of a similar resin laminate and ¼ that of the known plaster laminates discussed above, and this lightness is important not only in reducing transport costs, but also in reducing building costs by lightening the load that has to be supported by the structural framework of the building; 3) Complete incombustibility, not merely fire-resistance or fire-retardance; 4) The plaster laminate may easily be drilled for screws or nailed into position; 5) The plaster laminate may readily be repaired by applying plaster using techniques that are already familiar in the building industry; and 6) The plaster laminate may be produced in a complex shape, e.g., a dome or ceiling component.

BRIEF DESCRIPTION OF THE DRAWINGS

The present invention will now be described, by way of example, with reference to the accompanying drawings in which.

DETAILED DESCRIPTION

Figure 1A:
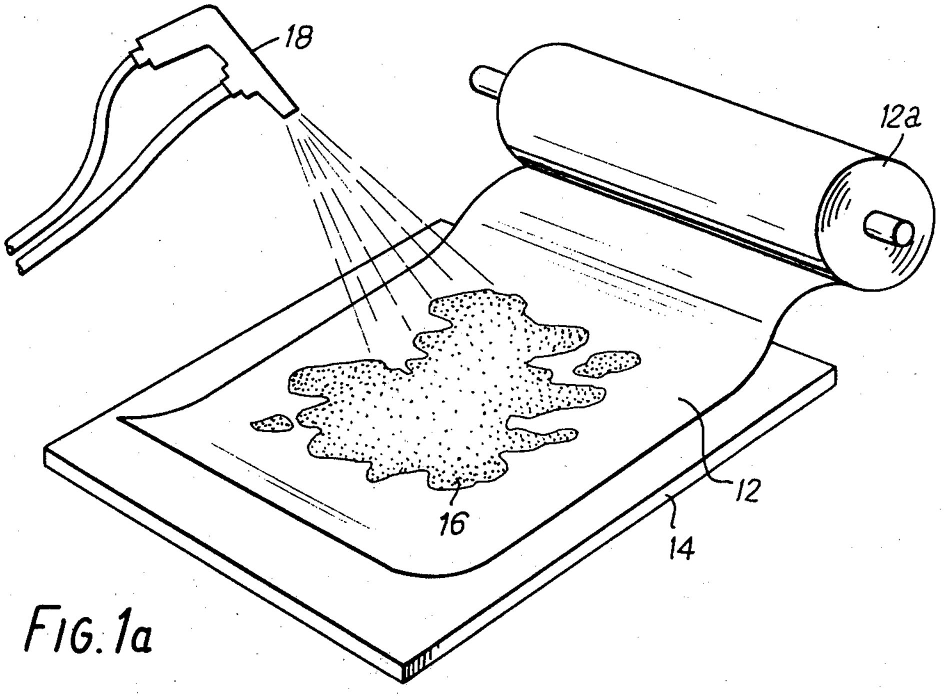
FIGS. 1*a* and *b* illustrate two steps in a process according to the invention for making a fibre-glass reinforced plaster laminate.
Figure 1B:
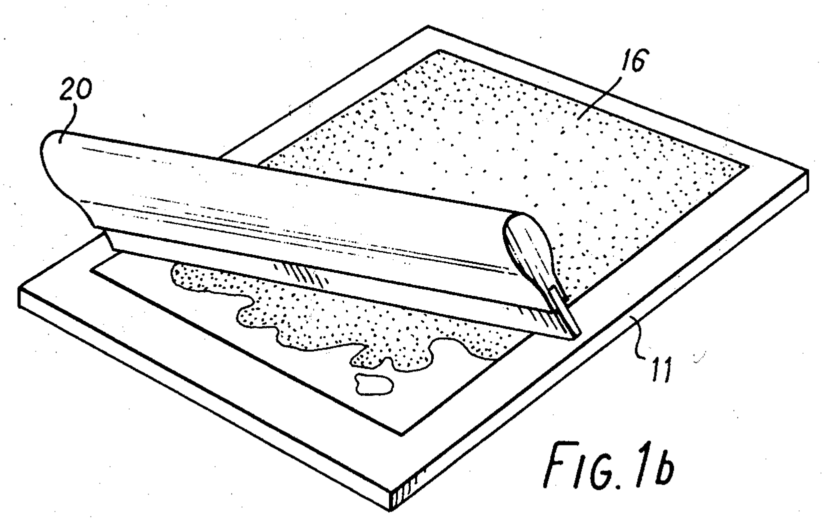
Figure 2:
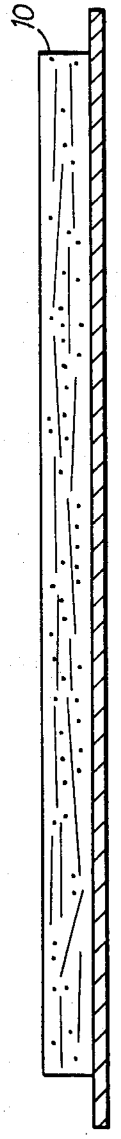
FIG. 2 is a schematic side view of a glass-fibre reinforced laminate according to the invention.

Referring to FIGS. 1*a*, *b* and 2 to make a plane plaster laminate 10, a layer of monofilament, continuous strand glass fibre tissue 12 is unrolled from a stock roll 12*a* and is placed on a plane moulding surface 14. A layer of thick slurry 16 formed from "Crystalcal" autoclave plaster and incorporating a wetting agent such as a non-foaming detergent and a setting retardant or, in the case of a small moulding, an accelerator, such as sodium citrate is then sprayed thereover from a spray gun 18. The slurry is then forced into the interstices of the glass fibre mat 12 by means for example of a squeegee or doctor blade 20. A further layer of tissue 12 is then placed on the slurry-impregnated first layer, followed by a further application of plaster slurry. This process is then repeated three more times, and it will have been inferred that the process is similar to the laying up of a glass fibre reinforced resin laminate. The final layer of tissue, however, is not impregnated with slurry but is allowed to absorb the plaster from previous layers. The grade of the fibre glass mat 12 is preferably less than about 0.5 ounces per square foot.

If desired, bands of carbon fibres about 2 inches wide and 3 inches apart may be placed between two layers of tissue. When the laying up has been completed, the plaster is dried by the application of heat using fan heaters, care being taken not to allow the temperature of the layer to exceed 40° C. When the layer 10 is removed from the moulding surface it will be found that the moulded surface is completely smooth despite the fact that the reinforcement was positioned before the plaster was applied, and that the other, unmoulded surface is of acceptable smoothness.

By applying the reinforcement to the mould surface first maximum strength is achieved because the very skin is reinforced as opposed to a conventional plaster or fibre glass laminate which has an unreinforced layer which is subject to crazing or stress cracking, a disadvantage which is eliminated by the present invention. The reinforced skin on the back of the laminate formed by the final layer of tissue endows the laminate with a structure corresponding to that of an I-section girder.

In another method according to the invention, a layer of plaster slurry 16 is spread over the moulding surface 11, a monofilament, continuous strand, fibre glass mat is laid over the layer of plaster slurry and is then forced through the slurry to achieve, in effect, a laminate similar to that obtained with the method described with reference to FIGS. 1*a* and *b*.

If a smooth surface is required on both sides this can be achieved by subsequently applying a moulding surface under pressure after laying up has been completed.

A rigid plaster laminate about ⅛ inch thick is produced by the above-described procedure. It may be endowed with flexibility by using the rolling technique described earlier. If carbon fibres are incorporated it is preferred not to roll the laminate in the direction of the fibres.

Figure 3:
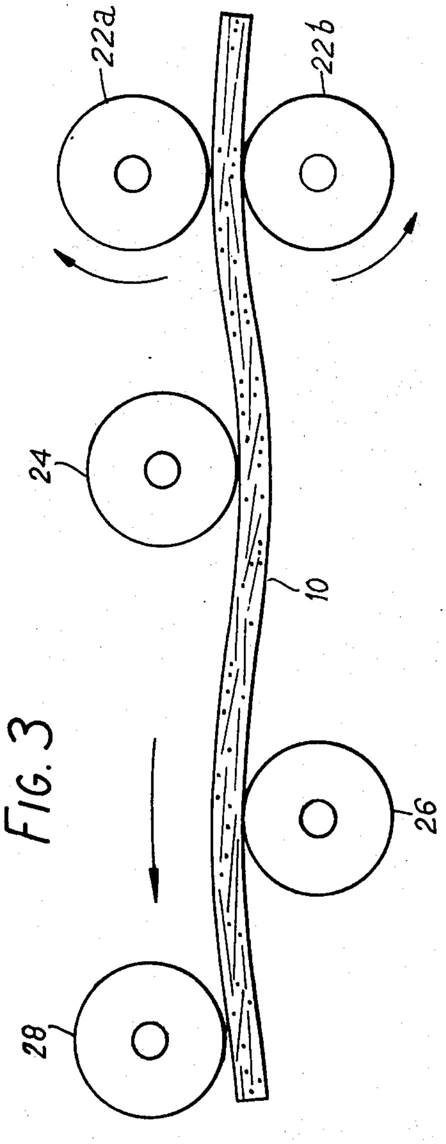
FIG. 3 is a schematic side view of apparatus for rolling a laminate to achieve flexion through a small angle.

FIG. 3 shows a schematic view of apparatus for rolling a laminate 10 between contra-rotating metal press rollers 22*a* and *b* and under a guide roller 24 whereby the laminate 10 is flexed downwardly (in the drawing) through an angle of up to about 10° and then upwardly between rollers 26 and 28 through a similar angle of up to about 10°. After the laminate 10 has passed through the various rollers it is found to be flexible in one direction in the manner of a corrugated sheet. If the laminate 10 is rolled biaxially it is found to flex in all directions.

I claim:

1. A lamina of plaster reinforced with monofilament, continuous strand glass fibre in the form of at least one mat distributed substantially throughout the thickness thereof.

2. A lamina as claimed in claim 1, in which the mat is tissue grade fibre glass mat.

3. A lamina as claimed in claim 2, in which the fibre glass mat has a grade less than 0.5 ounces per square foot.

4. A lamina as claimed in claim 3 having a thickness of not more than 5 mm.

5. A lamina as claimed in claim 1 and which is also reinforced with carbon fibre.

6. The lamina of claim 1 wherein said plaster is autoclaved plaster.

7. A composite laminate comprised of at least two of the lamina of claim 1.

8. The composite laminate of claim 7 wherein each lamina is disposed at right angles to each adjacent lamina.

9. The lamina of claim 1 wherein the monofilament, continuous strand glass fiber reinforcement constitutes about 4% by weight of the said lamina.

10. A flexible lamina of plaster reinforced with monofilament, continuous strand glass fibre in the form of at least one mat distributed substantially throughout the thickness thereof.

11. A flexible lamina as claimed in claim 10 having a thickness of not more than 5 mm.

12. The flexible lamina of claim 10 wherein said plaster is autoclaved plaster.

13. The flexible lamina of claim 10 wherein said monofilament, continuous strand glass fiber constitutes about 4% of said lamina.

14. The flexible lamina of claim 10 in which the mat is tissue grade fibre glass mat.

* * * * *